(12) United States Patent
Ohtani et al.

(10) Patent No.: US 6,542,205 B2
(45) Date of Patent: Apr. 1, 2003

(54) DISPLAY DEVICE

(75) Inventors: Hisashi Ohtani, Kanagawa (JP); Yukio Tanaka, Kanagawa (JP); Hiroshi Shibata, Kanagawa (JP); Akira Ishikawa, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 09/921,219

(22) Filed: Aug. 2, 2001

(65) Prior Publication Data

US 2002/0071072 A1 Jun. 13, 2002

(30) Foreign Application Priority Data

Aug. 4, 2000 (JP) ........................................ 2000-236676

(51) Int. Cl.⁷ ............................................. G02F 1/1335
(52) U.S. Cl. ........................ 349/47; 349/110; 349/111
(58) Field of Search ............................. 349/47, 39, 110, 349/111

(56) References Cited

U.S. PATENT DOCUMENTS

| 4,789,223 A | * 12/1988 | Kasahara et al. ............. 349/47 |
| 4,984,033 A | * 1/1991 | Ishizu et al. ................... 349/47 |
| 5,182,620 A | * 1/1993 | Shimada et al. ............... 349/47 |
| 5,233,211 A | * 8/1993 | Hayashi et al. ................ 349/47 |
| 5,643,826 A | 7/1997 | Ohtani et al. ................. 437/88 |
| 5,966,193 A | * 10/1999 | Zhang et al. .................. 349/47 |

FOREIGN PATENT DOCUMENTS

JP 7-130652 5/1995

* cited by examiner

Primary Examiner—James Dudek
(74) Attorney, Agent, or Firm—Cook, Alex, McFarron, Manzo, Cummings & Mehler, Ltd.

(57) ABSTRACT

In a pixel structure of an active matrix display device, aperture ratio and a sufficient storage capacitor are secured. A light shielding film provided under an active layer of a pixel TFT and the pixel TFT, the active layer of the pixel TFT, and a thinned gate insulating film are used to form a gate wiring and a capacitor.

44 Claims, 9 Drawing Sheets

DISPLAY DEVICE

BACKGROUND OF THE INVENTION

1. Field of the Invention

The present invention relates to an active matrix display device using a thin film transistor (hereinafter referred to as TFT) as a switching element, and more specifically, to a pixel structure of the active matrix display device.

2. Description of the Related Art

A liquid crystal display device with a method of performing driving by using TFTs (TFT driving method) is known as an active matrix display device. In the liquid crystal display device, a voltage applied to liquid crystal can be controlled for each pixel by using TFTs formed over a transparent substrate made of glass or the like, and thus, images are clear. Therefore, the liquid crystal display devices are widely used in OA equipment, TVs and the like.

Figure 1:
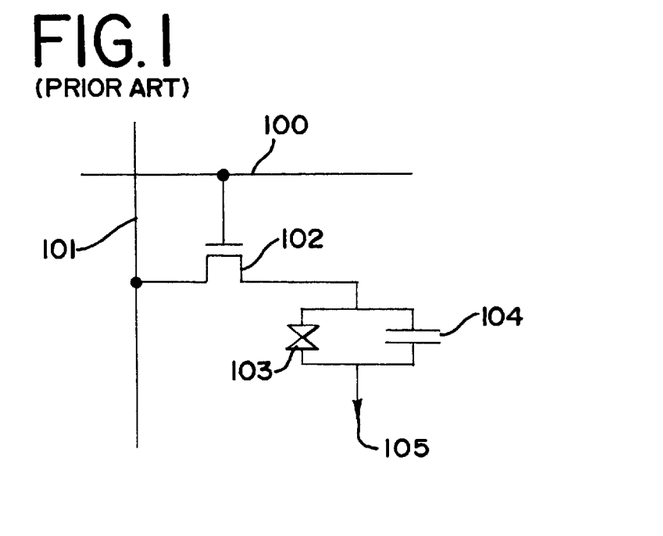
FIG. 1 is a diagram showing an equivalent circuit of one pixel of an active matrix liquid crystal display device.

FIG. 1 shows an equivalent circuit of one pixel in the liquid crystal display device with the TFT driving method. A pixel TFT 102 is arranged at an intersection portion of a gate signal line 100 and a source signal line 101. A gate terminal of the pixel TFT 102 is electrically connected with the gate signal line 100. One of input and output terminals of the pixel TFT 102 (a source or a drain terminal) is connected with the source signal line 101, and the other terminal is connected with a liquid crystal 103 and a storage capacitor 104.

When the pixel TFT 102 enters an ON state in response to a signal output to the pixel TFT 102 from the gate signal line 100, a potential of the source signal line 101 is written into the liquid crystal 103 and the storage capacitor 104, and an electric charge is stored. Even after the pixel TFT 102 enters an OFF state, the electric charge stored in the liquid crystal 103 and the storage capacitor 104 tries to hold the written potential. A necessary value of the storage capacitor 104 is determined in accordance with an off current, a holding time, a parasitic capacitor and the like of the pixel TFT 102 that becomes a switching element.

Figure 2:
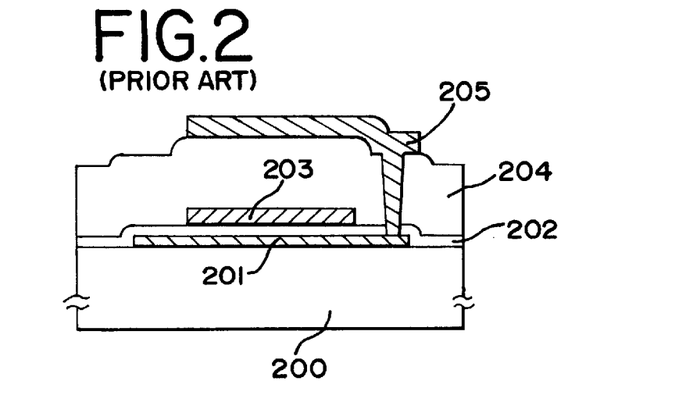
FIG. 2 is a cross sectional view showing a structure of a conventional storage capacitor.

FIG. 2 shows a cross-sectional structure of one example of a conventional storage capacitor. The storage capacitor is formed by an active layer 201 and a capacitor wiring 203 formed from the same film as that for a gate wiring as electrodes, and a gate insulating film 202 as a dielectric, which is formed between the active layer 201 and the capacitor wiring 203. By using the gate insulating film 202 as the dielectric, the highly reliable and high-quality storage capacitor can be formed even with the thin thickness.

Figure 3:
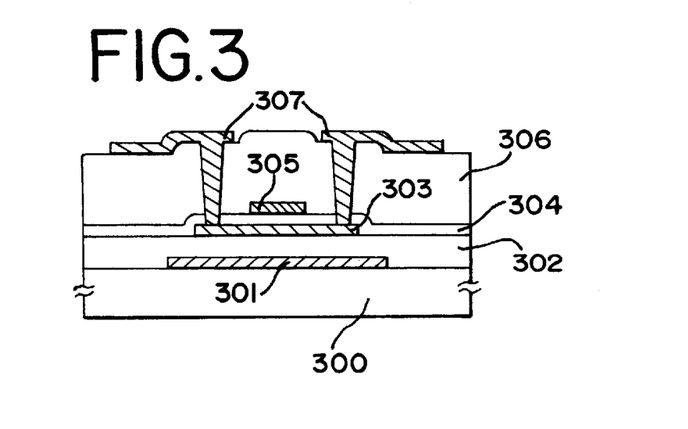
FIG. 3 is a diagram showing a state that a light shielding film is provided under a pixel TFT.

Further, it is desirable that the active matrix display device is provided with a light shielding film. FIG. 3 shows a cross-sectional structure of a pixel TFT provided with a light shielding film under the pixel TFT as one such example. The light shielding film 301 and an insulating film 302 are formed on a glass substrate 300, and an active layer 303, a gate insulating film 304, and a gate wiring 305, which are provided for forming the pixel TFT, are sequentially laminated thereon. The light shielding film prevents light leakage and improves contrast, and there is obtained an effect of reducing an off current of the pixel TFT by shielding the pixel TFT from light. When the off current of the pixel TFT is reduced, the display data holding characteristic is improved, thereby obtaining a satisfactory display.

As a method of improving display quality (image quality) of the conventional active matrix display device and attaining energy saving, miniaturization and high reliability of the display device, the following points are given.

The first point is that, in the active matrix display device, a capacitor element structure is obtained, which can secure a sufficient storage capacitor even if an area for one pixel is reduced with higher resolution. If each pixel is provided with a storage capacitor that can have a large capacitor, the display data holding characteristic is improved, and thus, a satisfactory display can be obtained.

The second point is that, in the active matrix display device, an aperture ratio is not reduced while a sufficient storage capacitor is secured. If each pixel has a high aperture ratio, utilization efficiency of light of backlight is improved. Thus, energy saving and miniaturization of the display device can be attained.

Further, light leakage is prevented and contrast is improved by arranging the light shielding film. In addition, the off current of the pixel TFT is reduced by shielding the pixel TFT from light, which leads to an improvement of the display data holding characteristic.

SUMMARY OF THE INVENTION

Demands for an improvement of performance of an active matrix display device such as for high precision (minuteness of a pixel TFT), securing a sufficient storage capacitor, a high aperture ratio, and a light shielding film, are opposed to each other in a meaning that one demand is satisfied while other demands are neglected. An object of the present invention is to improve performance of the active matrix liquid crystal display device while the above demands are satisfied.

The present inventors contrived the formation of a storage capacitor with the use of a light shielding film in order to satisfy these mutually opposing demands. Further, the present inventors proposed a method of forming a storage capacitor having a large capacitor without lowering an aperture ratio.

Figure 4A:
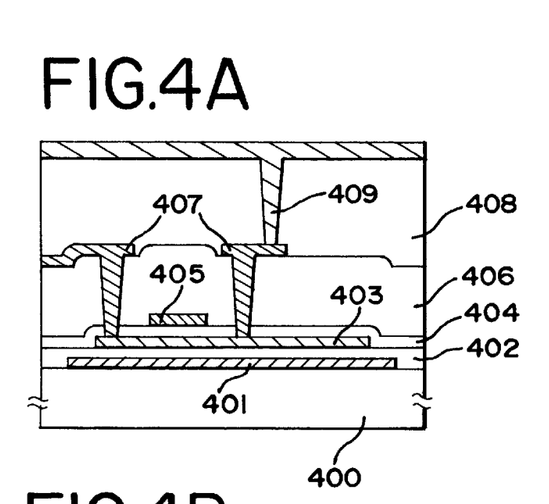
FIGS. 4A and 4B show structures of a storage capacitor of the present invention.

FIG. 4A is a cross sectional view showing an example in which a light shielding film and a capacitor are formed by extending source and drain regions of a pixel TFT. A light shielding film 401 and a dielectric (first insulating film) 402 are formed on a glass substrate 400. One of the source and drain regions of the pixel TFT, which is connected with a pixel electrode 409, is widened in order to secure a necessary storage capacitor to thereby form an active layer 403.

The light shielding film 401 has conductivity and may be connected at the outside of a pixel region so as to have a constant potential such as a COMMON potential or a power supply. In a case where the capacitor of the light shielding film 401 is sufficiently larger than the storage capacitor of the pixel, the light shielding film 401 does not have to be connected at a constant potential as long as the potential variation is sufficiently small. Thus, the storage capacitor is formed by the active layer 403 and the light shielding film 401.

Figure 4B:
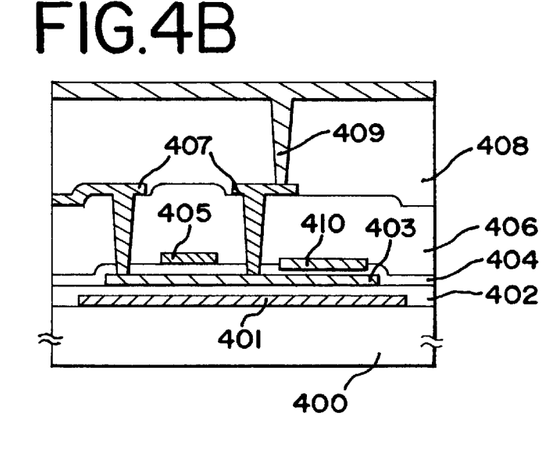

FIG. 4B is a diagram in which, in addition to the storage capacitor formed by the light shielding film 401 and the active layer 403, a capacitor wiring 410 is formed to secure a storage capacitor having a larger capacity. A gate insulating film 404 is formed on the active layer 403, and a gate wiring 405 and the capacitor wiring 410 are simultaneously formed. The capacitor wiring 410 is connected at the outside of the pixel region so as to have a constant potential such as a COMMON potential or a power supply to thereby form a capacitor with the active layer 403. In this way, a larger storage capacitor is secured without lowering an aperture ratio. Further, in FIG. 4B, the gate insulating film formed under the capacitor wiring 410 is formed to be thin in order to enlarge the storage capacitor.

In FIGS. 4A and 4B, the capacitors are formed by the source and drain regions of the pixel TFT and the light shielding film 401 arranged under the regions. However, the capacitor is not needed with respect to the region connected with a source signal line. The reason for that is because a charge in writing in a video signal to the source signal line increases if the capacitor is formed to the source signal line. Thus, as shown in FIGS. 5A and 5B, a structure is proposed in which a light shielding film is provided in two layers so as not to form a capacitor with respect to the region connected with the source signal line.

Figure 5A:
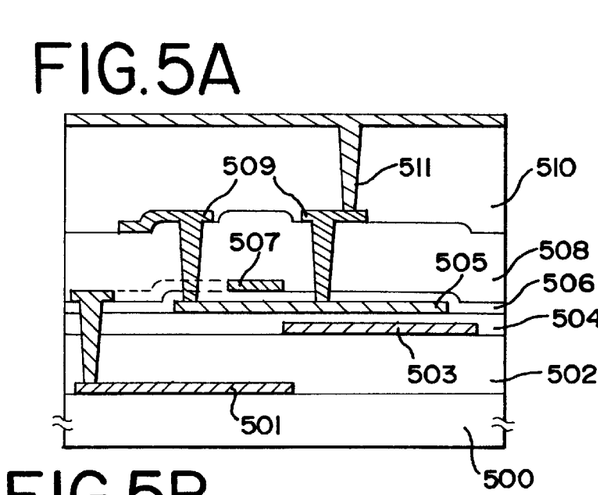
FIGS. 5A and 5B show structures of the storage capacitor of the present invention.
Figure 5B:
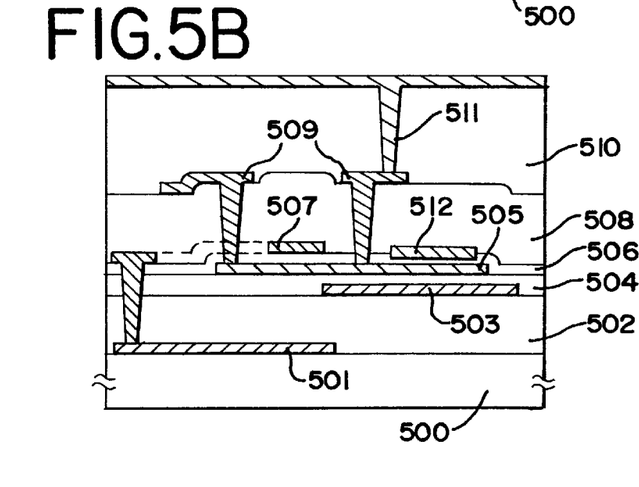

FIG. 5A shows an example of two layers of the light shielding film. A first light shielding film 501 is formed on a glass substrate 500, an insulating film 502 is formed thereon for insulation, and a second light shielding film 503 is formed. In FIGS. 5A and 5B, the first light shielding film 501 shields one of source and drain regions of a pixel TFT, which is connected with a source signal line, from light in order not to have a capacitor with an active layer 505. Further, the first light shielding film 501 has a contact with a gate wiring 507 to be used as a gate signal line.

The second shielding film 503 shields one of the source and drain regions of the pixel TFT, which is connected with a pixel electrode, from light to form a capacitor with the active layer 505. The structure in which light is not incident on the active layer 505 is taken by both the first light shielding film 501 and the second light shielding film 503. FIG. 5B is a diagram in which a capacitor wiring 512 is provided in FIG. 5A.

Note that the portion not shielded by the light shielding film indicates the portion that can be seen from the substrate side. At least a channel portion (channel forming region), an LDD region, and an offset region under a gate electrode of the active layer 505 should be shielded from light by the first light shielding film 501 and the second light shielding film 503.

DETAILED DESCRIPTION OF THE PREFERRED EMBODIMENTS

A manufacturing process of a display device (a liquid crystal display device, an EL display device or the like) using a light shielding film of an active matrix display device of the present invention for a capacitor electrode (a storage capacitor) is described with reference to the accompanying drawings.

[Embodiment 1]

A method of manufacturing an active matrix substrate, in particular, a method of manufacturing a pixel portion is described with reference to FIGS. 6A to 8E. The pixel portion is composed of a region where a pixel TFT, which is a TFT provided in a pixel, exists (a TFT, forming region) and a display region. Note that, in this specification, an "electrode" is a part of a "wiring", and although the "wiring" and the "electrode" are respectively used to suit the situation for convenience, the "wiring" is always included in the "electrode".

Figure 6A:
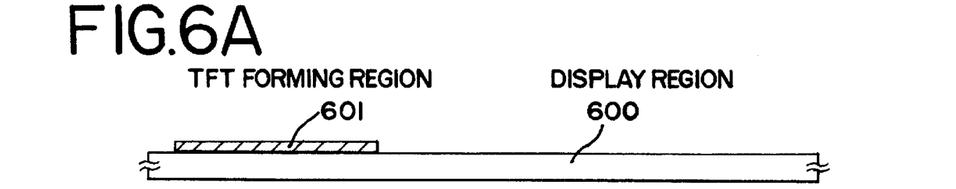
FIGS. 6A to 6G show a manufacturing process of a pixel portion in accordance with Embodiment 1.

In FIG. 6A, a glass substrate or a quartz substrate may be used as a substrate 600. In addition, a silicon substrate, a metal substrate or a stainless substrate, formed with an insulating film on the surface, may be used. A plastic substrate may be used as far as it has sufficient heat-resistance. Then, as a first light shielding film 601, a polysilicon film with a thickness of 50 nm and a tungsten silicide (W—Si) film with a thickness of 100 nm are laminated in an island shape.

Figure 6B:
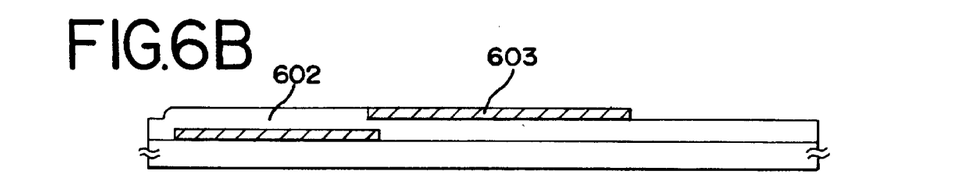

A first insulating film 602 is formed on the first light shielding film 601 (FIG. 6B). In this embodiment, a silicon oxide film with a thickness of 100 to 1000 nm (typically, 300 to 500 nm) is used as the first insulating film 602. Note that, a nitride film containing silicon or a silicon oxynitride film may be used as the first insulating film 602. Further, on the first insulating film 602, a polysilicon film with a thickness of 50 nm and a tungsten silicide (W—Si) film with a thickness of 100 nm are formed in lamination with an island shape as a second light shielding film 603.

Note that, in addition to a tungsten film, an element selected from the group consisting of tantalum (Ta), titanium (Ti), molybdenum (Mo), tungsten (W), chrome (Cr) and silicon (Si) or an alloy film of the combination of the above elements may be used for the first light shielding film 601 and the second light shielding film 602.

Figure 6C:
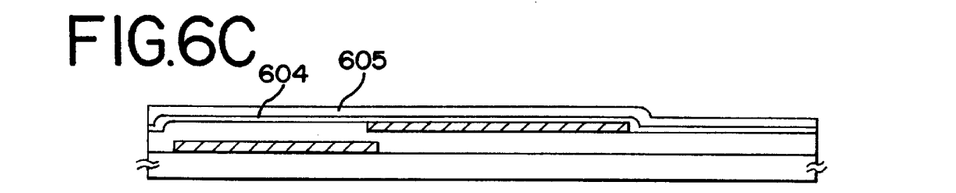

Next, a silicon oxide film with a thickness of 10 to 150 nm is formed as a second insulating film 604 (FIG. 6C). Note that the second insulating film 604 becomes a dielectric for forming a capacitor formed by the second light shielding film 603 and an active layer of a TFT. It is preferable that the second light shielding film 603 has a thickness of 300 nm, which is twice the thickness of 150 nm of the first light shielding film in this embodiment, or more. However, it is desirable that the thickness of the second light shielding film 603 is at least 300 nm or less, preferably 150 nm or less because the capacity per unit area is reduced with larger thickness.

Subsequently, an amorphous semiconductor film (an amorphous silicon film 605 in this embodiment) having a thickness of 10 to 100 nm is formed on the second insulating film 604 by a known film depositing method. As the amorphous semiconductor film, besides the amorphous silicon film, an amorphous compound semiconductor film such as an amorphous silicon germanium film may be used.

Figure 6D:
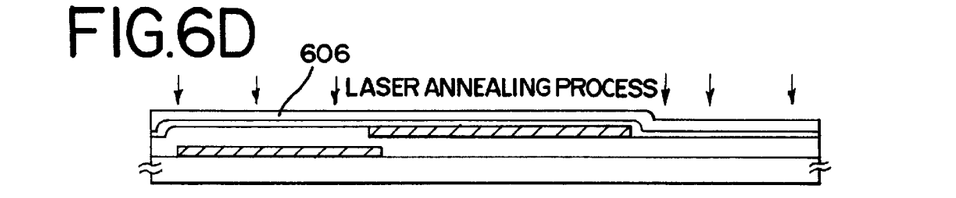

Then, a semiconductor film containing a crystalline structure (a crystalline silicon film in this embodiment) 606 is formed in accordance with the technique described in Japanese Patent Application Laid-open No. Hei 7-130652 (corresponding to U.S. Pat. No. 5,643,826). The technique described in the application is a crystallization means using a catalyst element that promotes crystallization (one or a plurality of elements selected from the group consisting of nickel, cobalt, tin, lead, palladium, iron, and copper, typically nickel) in crystallization of the amorphous silicon film.

Specifically, heating processing is conducted with the state that a catalyst element is held on the surface of the amorphous silicon film to change the amorphous silicon film into the crystalline silicon film. In this embodiment, the technique described in Embodiment 1 of the application is used, but the technique described in Embodiment 2 may also be used. Note that the crystalline silicon film includes both a single crystalline silicon film and a polycrystalline silicon film. However, the crystalline silicon film formed in this embodiment is a silicon film having a crystal grain boundary.

Although depending on a hydrogen content, the amorphous silicon film is desirably subjected to dehydrogenation processing by heating processing at 400 to 550° C. for several hours to perform a crystallization process with a hydrogen content of 5 atomic % or less. Moreover, the amorphous silicon film may be manufactured by another method such as a sputtering method or an evaporation method, but it is desirable that impurity elements such as oxygen and nitrogen in the film are sufficiently reduced.

Alternatively, a laser crystallization technique may be used to form a crystalline silicon film (a polysilicon film or a polycrystalline silicon film) 606 (FIG. 6D). In this case, light emitted from a laser (laser light) is irradiated onto the amorphous silicon film 605 to form the crystalline silicon film 606. A pulse oscillation type or continuous oscillation type excimer laser may be used as the laser, and a continuous oscillation type argon laser may also be used. Further, a second harmonic, third harmonic, and fourth harmonic of an Nd:YAG laser or an Nd:YVO$_4$ laser may be used. Besides, the beam of the laser light may have a linear shape (including a rectangular shape) or a square shape.

Further, instead of laser light, light emitted from a lamp (lamp light) may be irradiated (hereinafter referred to lamp annealing). The lamp light emitted from a halogen lamp, an infrared lamp or the like may be used.

A process of conducting heating processing (annealing) with laser light or lamp light as described above is refereed to a light annealing process. In the light annealing process, since heating processing at a high temperature can be conducted for a short times effective heating processing can be conducted with high throughput even in a case where a substrate with low heat-resistance such as a glass substrate is used. Of course, since the purpose is to conduct annealing, a furnace annealing (also referred to thermal annealing) using an electrothermal furnace may be conducted instead.

In this embodiment, the laser light of the pulse oscillation type excimer laser is processed into a linear shape, and a laser annealing process is performed. Laser annealing conditions are that an XeCl gas is used as an excitation gas, a treatment temperature is set to room temperature, a pulse oscillation frequency is set to 30 Hz, and a laser energy density is set to 250 to 500 mJ/cm$^2$ (typically 350 to 400 mJ/cm$^2$).

The laser annealing process with the above conditions has an effect that an amorphous region remaining after thermal crystallization is completely crystallized and a defect and the like of a crystalline region, which has already been crystallized, are reduced. Therefore, this process can be regarded as a process of improving a crystallinity of a semiconductor film by light annealing or a process of promoting crystallization of a semiconductor film. Such an effect may also be obtained by optimizing lamp annealing conditions.

Next, a protective film 607 is formed on the crystalline silicon film 606 for a subsequent process of adding impurities. A silicon oxynitride film or a silicon oxide film with a thickness of 100 to 200 nm (preferably 130 to 170 nm) is used as the protective film 607. The protective film 607 is used in order that the crystalline silicon film 606 is not directly exposed to plasma in the process of adding impurities and that fine temperature control may be realized.

Figure 6E:
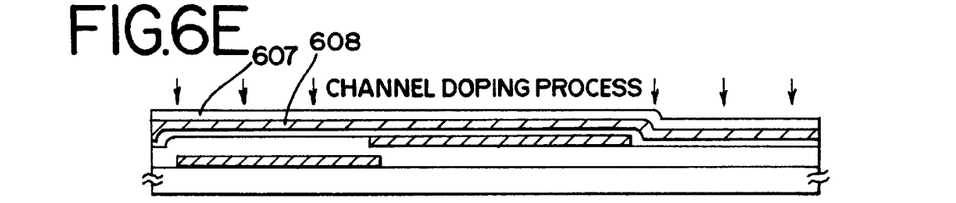

Subsequently, an impurity element that imparts p-type conductivity (hereinafter, referred to as p-type impurity element) is added through the protective film 607. As the p-type impurity element, typically, elements belonging to group 13 of the periodic table, particularly boron or gallium may be used. This process (referred to channel doping process) is a process for controlling a threshold voltage of a TFT. Note that boron is added by an ion doping method in which diborane (B$_2$H$_6$) is plasma-excited without mass separation. Of course, an ion implantation method with mass separation may also be used.

With this process, a p-type impurity region (a) 608 containing a p-type impurity element (boron in this embodiment) is formed at a concentration of $1 \times 10^{15}$ to $1 \times 10^{18}$ atoms/cm$^3$ (typically, $5 \times 10^{16}$ to $5 \times 10^{17}$ atoms/cm$^3$) (FIG. 6E).

Figure 6F:
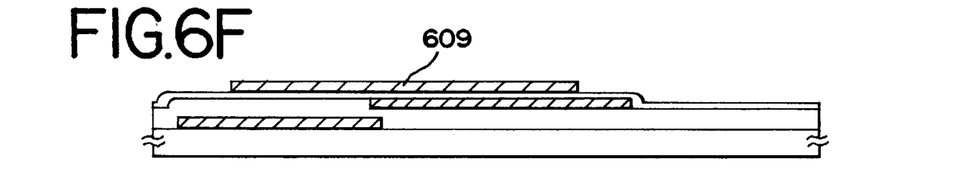

Next, after the protective film 607 is removed, an unnecessary portion of the crystalline silicon film is removed to form an island-like semiconductor film (hereinafter referred to as active layer) 609 (FIG. 6F).

Figure 6G:
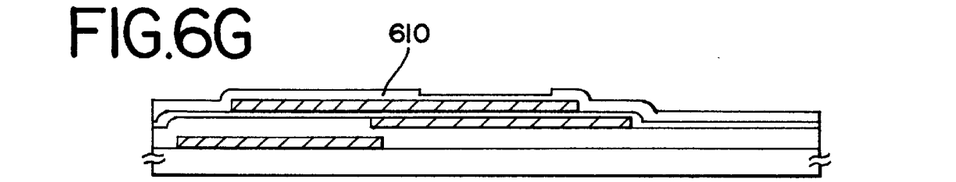

Subsequently, a gate insulating film 610 is formed covering the active layer 609 (FIG. 6G). The gate insulating film 610 is formed with a thickness of 10 to 200 nm, preferably 50 to 150 nm. In this embodiment, a silicon oxynitride film made from N$_2$O and SiH$_4$ is deposited twice by a plasma CVD method. First, a first silicon oxynitride film (insulating film) is deposited with a thickness of 20 nm. Next, the first silicon oxynitride film (insulating film) in a region where a capacitor wiring is formed is etched. Then, a second silicon oxynitride film (insulating film) is deposited with a thickness of 60 nm. Then, the insulating film (second silicon oxynitride film) of 60 nm thickness is formed under the capacitor wiring, and the gate insulating film (first silicon oxynitride film plus second silicon oxynitride film) of 80 nm thickness is formed in the channel portion of the TFT. That is, the thickness of the insulating film sandwiched by the active layer and the capacitor wiring is 60 nm, and the thickness of the insulating film sandwiched by the active layer and the gate electrode is 80 nm, which means that there is a difference in thickness between these insulating films.

Figure 7A:
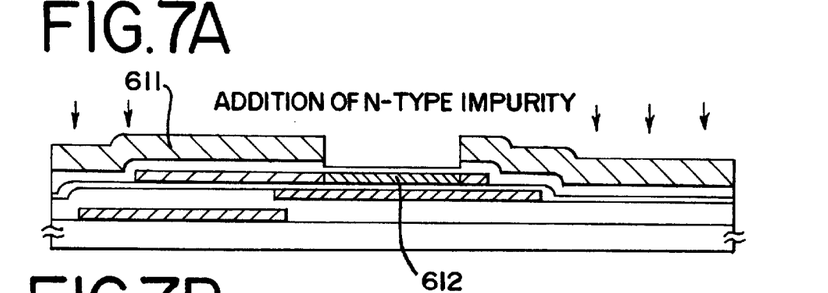
FIGS. 7A to 7E show the manufacturing process of the pixel portion in accordance with Embodiment 1.

The gate insulating film 610 is covered with a resist mask 611 except for the portion in which the insulating film (gate insulating film) is formed with a thickness of 20 nm, and an n-type impurity element (phosphorous in this embodiment) is added to form an n-type impurity region (a) 612 containing phosphorous at a high concentration (FIG. 7A). The n-type impurity region (a) 612 is formed by an ion doping method using phosphine (PH$_3$) (of course, an ion implantation method may be conducted), and a phosphorous concentration of this region is set to $1 \times 10^{20}$ to $1 \times 10^{21}$ atoms/cm$^3$ (typically, $2 \times 10^{20}$ to $5 \times 10^{20}$ atoms/cm$^3$). Further, boron added in the preceding step is included in the region where the n-type impurity region (a) 612 is formed. However, since phosphorous is added at a sufficiently high concentration, the influence of boron added in the preceding step does not have to be considered.

Figure 7B:
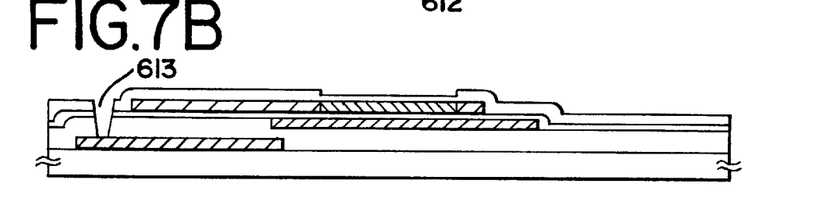

The resist mask 611 is removed, and an opening portion 613 for making a contact from the first light shielding film to the gate wiring is formed (FIG. 7B). In this embodiment, since the first light shielding film serves as a gate signal line, a contact connecting the first light shielding film and the gate wiring is formed in the pixel portion.

Figure 7C:
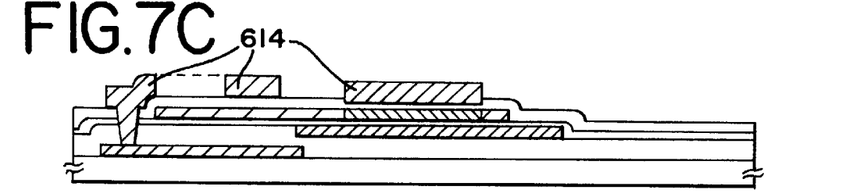

Although not shown in the figure, a lamination film of two layers of a tungsten nitride (WN) film of 50 nm thickness and a tantalum (Ta) film of 350 nm thickness is formed as a gate wiring 614 (FIG. 7C). The gate wiring 614 may be formed as a single layer of a conductive film, but is preferably formed as a lamination film of two or three layers as occasion demands.

Note that, as the gate wiring 614, an element selected from the group consisting of tantalum (Ta), titanium (Ti), molybdenum (Mo), tungsten (Ta), chrome (Cr) and silicon (Si), or an alloy film of the combination of the above elements (typically, Mo—W alloy, and Mo—Ta alloy) may be used.

Figure 7D:
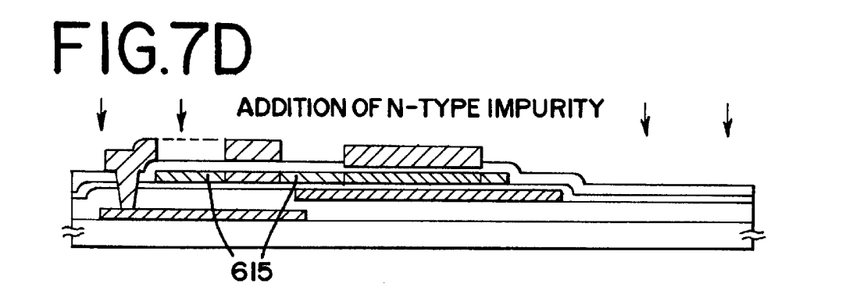

Next, an n-type impurity element (phosphorous in this embodiment) is added in a self-aligning manner using the gate wiring 614 as a mask (FIG. 7D). In an n-type impurity region (b) 615 thus formed, it is adjusted such that phosphorous is added at a concentration that is five to ten times as high as the concentration of boron added in the channel doping process (representatively $1 \times 10^{16}$ to $5 \times 10^{18}$ atoms/cm$^3$, typically $3 \times 10^{17}$ to $3 \times 10^{18}$ atoms/cm$^3$).

Figure 7E:
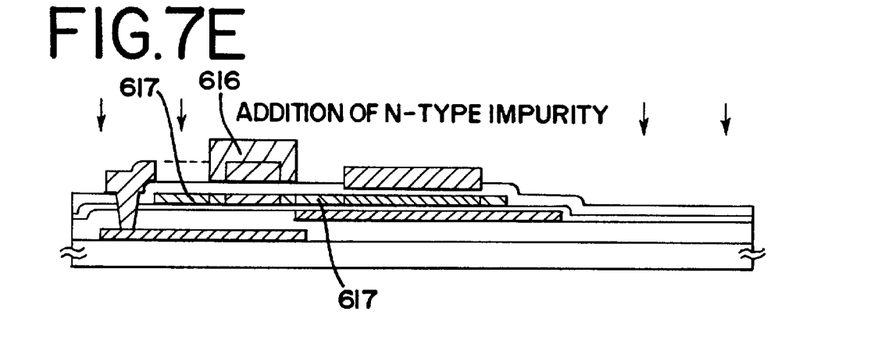

A resist mask 616 is formed, and an n-type impurity element (phosphorous in this embodiment) is added to form an n-type impurity region (c) 617 containing phosphorous at a high concentration (FIG. 7E). In this process as well, an ion doping method using phosphine (PH$_3$) (of course, an ion implantation method may also be conducted) is conducted, and the phosphorous concentration in this region is set to $1 \times 10^{20}$ to $1 \times 10^{21}$ atoms/cm$^3$ (typically $2 \times 10^{20}$ to $5 \times 10^{20}$ atoms/cm$^3$).

Further, phosphorous or boron added in the preceding step is contained in the region where the n-type impurity region (c) 617 is formed. However, since phosphorous is added at a sufficiently high concentration, the influence of phosphorous or boron added in the preceding step does not have to be considered.

Figure 8A:
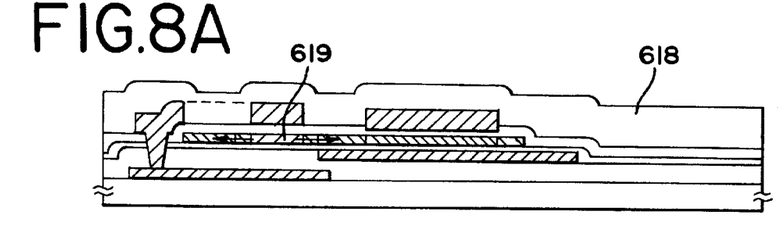
FIGS. 8A to 8E show the manufacturing process of the pixel portion in accordance with Embodiment 1.
Figure 8B:
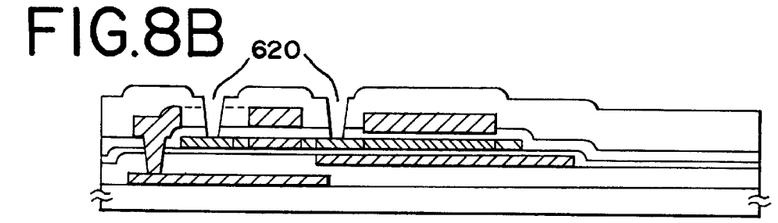
Figure 8C:
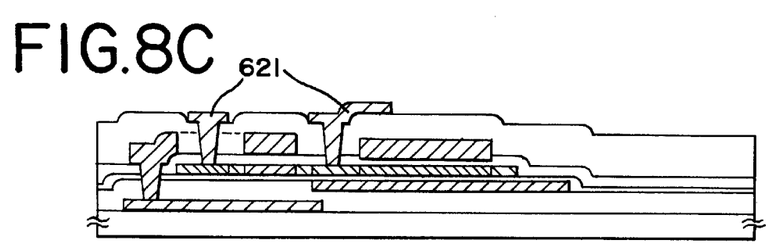

After the resist mask 616 is removed, a fourth insulating film 618 is formed (FIG. 8A). The fourth insulating film 618 is formed of an insulating film containing silicon, specifically, a silicon nitride film, a silicon oxide film, a silicon oxynitride film or a lamination film of the combination of these films, with a thickness of 600 nm to 1.5 μm. In this embodiment, as the fourth insulating film 618, a silicon oxynitride film (the nitrogen concentration is 25 to 50 atomic %) with a thickness of 1 μm, which is formed from SiH$_4$, N$_2$O and NH$_3$ as material gases by a plasma CVD method, is used.

Thereafter, heat processing is conducted for activation of the n-type or p-type impurity element added at the respective concentrations (FIG. 8A). This process can be performed by a furnace annealing method, a laser annealing method, or a rapid thermal annealing method (RTA) method. Here, the activation process is performed by the furnace annealing method. The heat processing is conducted in a nitrogen atmosphere at 300 to 650° C., preferably 400 to 550° C. In this embodiment, the heat processing is conducted for four hours at 550° C.

In case of that the catalyst element (nickel in this embodiment) was used in the crystallization step, the catalyst element moves to a direction indicted by an arrow and is gettered to the n-type impurity region (c) 617 containing phosphorous at a high concentration formed in the process of FIG. 7E. This is a phenomenon that arises from a gettering effect of a metal element by phosphorous. As a result, in a channel region 619, the catalyst element concentration becomes $1 \times 10^{17}$ atoms/cm$^3$ or less (preferably, $1 \times 10^{16}$ atoms/cm$^3$ or less).

Further, in the region that has become a gettering site of the catalyst element (n-type impurity region (c) 617 formed in the process of FIG. 7E), the catalyst element segregates at a high concentration, so that the concentration becomes $5 \times 10^{18}$ atoms/cm$^3$ or more (typically, $1 \times 10^{19}$ to $5 \times 10^{20}$ atoms/cm$^3$).

Furthermore, heat processing is conducted for 1 to 12 hours at 300 to 450° C. in an atmosphere containing hydrogen of 3 to 100% to perform a process of hydrogenating an active layer. This is a process of terminating dangling bonds in a semiconductor layer by thermally excited hydrogen. As another means for hydrogenation, plasma hydrogenation (using hydrogen excited by plasma) may be conducted.

Thereafter, an opening portion 620 that reaches the source and drain regions of the TFT (FIG. 8B) and source and drain wiring 621 (FIG. 8C) are formed. Further, although not shown in the figure, in this embodiment, this wiring is formed of a lamination film of a three-layer structure in which a Ti film of 100 nm thickness, an aluminum film of 300 nm thickness containing Ti, and a Ti film of 150 nm thickness are continuously formed by a sputtering method.

Figure 8D:
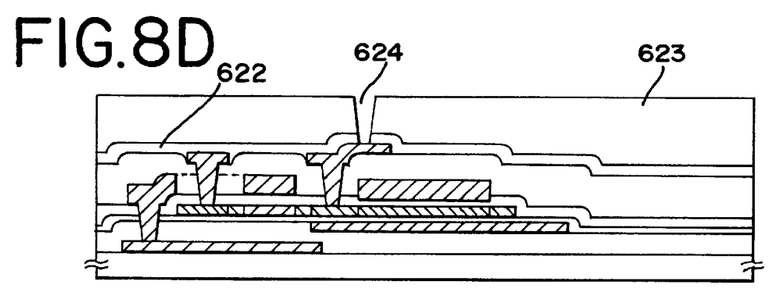

Subsequently, as a passivation film 622, a silicon nitride film, a silicon oxide film or a silicon oxynitride film is formed with a thickness of 50 to 500 nm (typically, 200 to 300 nm) (FIG. 8D). At this time, in this embodiment, plasma processing is conducted using a gas containing hydrogen such as H$_2$ or NH$_3$ prior to the film formation, and heat processing is conducted after the film formation. The hydrogen excited by this pretreatment is supplied into the fourth insulating film 618. By conducting the heat processing in this state, the film quality of the passivation film 622 is improved, and also, the hydrogen added into the fourth insulating film 618 is diffused to the lower side. Thus, the active layer can be effectively hydrogenated.

Further, after the formation of the passivation film 622, a hydrogenation process may further be performed. For example, in an atmosphere containing hydrogen of 3 to 100%, the heat processing for 1 to 12 hours at 300 to 450° C. is preferably conducted. The same effect can be obtained by using a plasma hydrogenation method. Note that, in this process, an opening portion may be formed in the passivation film 622 at the position where the opening portion for connecting the pixel electrode and the source and drain wiring later is formed.

Thereafter, a fifth insulating film 623 made of organic resin is formed with a thickness of about 1 m (FIG. 8D). As the organic resin, polyimide, acrylic, polyamide, polyimide amide, BCB (benzocyclobuten) or the like may be used. The advantages of using the organic resin film may be given as follows. That is, the film deposition method is simple, the parasitic capacitance can be reduced because of the low relative dielectric constant, the flatness property is excellent, and the like. Note that, in the present invention, any materials such as organic resin films and organic-based SiO compounds may be used other than the above films. In this embodiment, polyimide of a type that is capable of thermal polymerization after application to the substrate is used and burned at 300° C. to form the fifth insulating film 623.

Figure 8E:
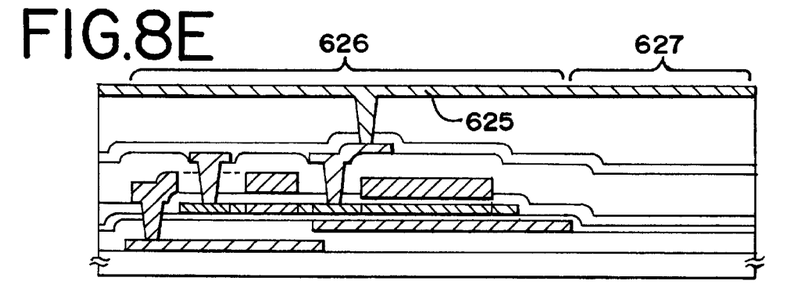

Next, an opening portion 624 that reaches the source and drain wiring 621 is formed in the fifth insulating film 623 and the passivation film 622 to form a pixel electrode 625

(FIGS. 8D and 8E). For the pixel electrode 625, a transparent conductive film may be used in case of a transmission type liquid crystal display device, and a metal film may be used in case of a reflection type liquid crystal display device. Here, in order to obtain the transmission type liquid crystal display device, an indium-tin oxide (ITO) film is formed with a thickness of 110 nm by a sputtering method.

Thus, in the pixel portion, a pixel TFT region 626 comprised of an n-channel TFT is formed while an area of a display region 627 is secured, thereby being capable of obtaining a sufficient storage capacitor.

Note that, although not formed in this embodiment, an LDD region may be formed in the crystalline silicon film 606 using a known method. Note also that the LDD region indicates a light-doped-drain region in this specification. Further, an offset region may be formed in the crystalline silicon film 606 using a known method. Note that the offset region indicates a region where an impurity element is doped while shifted from a gate electrode in this specification.

[Embodiment 2]

Figure 9:
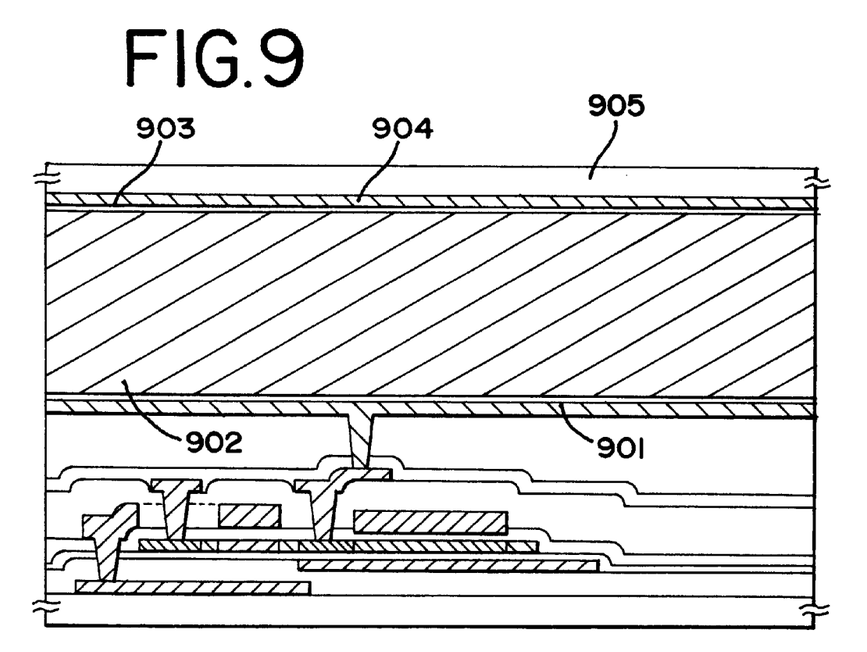
FIG. 9 is a cross sectional view of the active matrix liquid crystal display device.

In this embodiment, a process of manufacturing an active matrix liquid crystal display device from the active matrix substrate manufactured in Embodiment 1 is described. As shown in FIG. 9, an orientation film 901 is formed to the substrate in the state of FIG. 8E. In this embodiment, a polyimide film is used as the orientation film. Further, an opposing electrode 904 formed of a transparent conductive film and an orientation film 903 are formed on an opposing substrate 905. Note that a color filter or a shielding film may be formed on the opposing substrate if necessary.

After the orientation film is formed, rubbing processing is conducted such that liquid crystal molecules are oriented with a certain constant pre-tilt angle. Then, the active matrix substrate on which a pixel portion and a driver circuit are formed and the opposing substrate are sealed through a sealing member, a spacer (both not shown in the figure) or the like by a known cell assembling process. Thereafter, liquid crystal 902 is injected between the both substrates to completely seal the liquid crystal by a sealant (not shown). A known liquid crystal material may only be used as the liquid crystal. Thus, the active matrix liquid crystal display device shown in FIG. 9 is completed.

Figure 10:
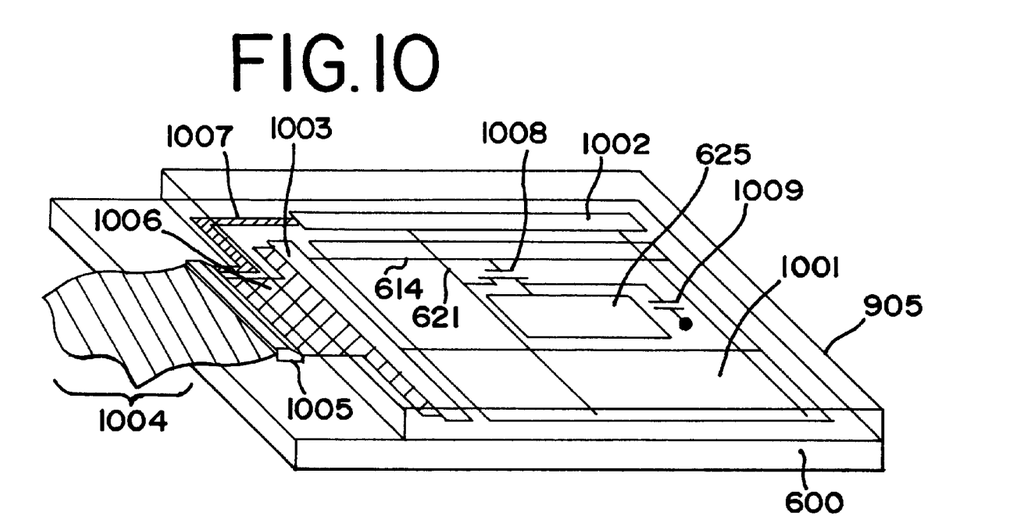
FIG. 10 is a perspective view of the active matrix liquid crystal display device.

Next, the structure of this active matrix liquid crystal display device is explained with reference to a perspective view of FIG. 10. Note that FIG. 10 uses common signals for correspondence with cross-sectional views of FIGS. 6A to 9. The active matrix substrate is constituted of a pixel portion 1001 formed on the glass substrate 600, a gate signal driver circuit 1003 and a data (source) signal driver circuit 1002. A pixel TFT 1008 is an n-channel TFT, and the driver circuit provided in the periphery thereof is structured on the basis of a CMOS circuit. The gate signal driver circuit 1003 and the data signal driver circuit 1002 are connected with the pixel portion 1001 through the gate wiring 614 and the source and drain wiring 621 (source signal line), respectively. Further, connection wirings 1006 and 1007 from an input terminal 1005 connected with an FPC 1004 to input and output terminals of the driver circuit are provided.

Note that this embodiment can be freely combined with Embodiment 1.

[Embodiment 3]

An example of manufacturing an EL (electro luminescence) display device using the present invention will be described. Note that FIG. 11 is a top surface diagram of an EL display device of the present invention, and FIG. 12 is a cross sectional diagram.

Figure 11:
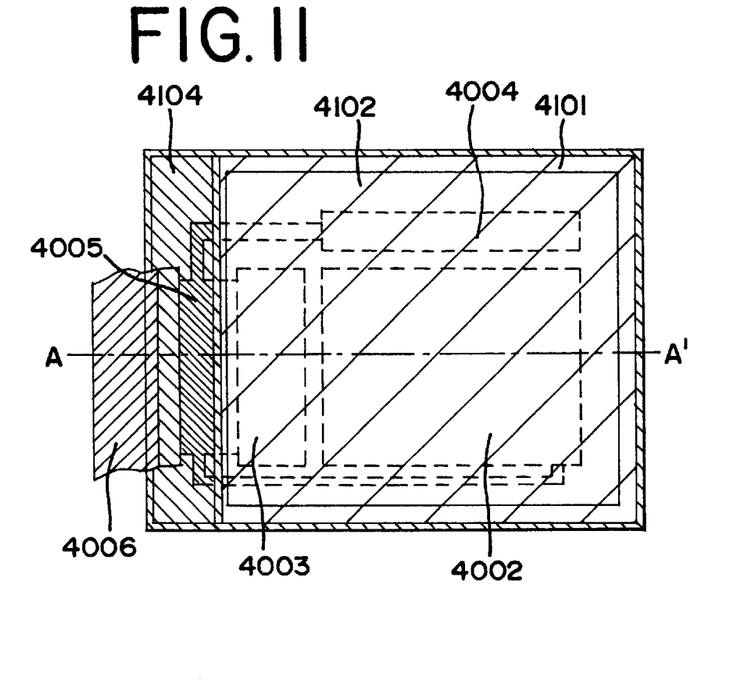
FIG. 11 shows a structure of an active matrix EL display device.
Figure 12:
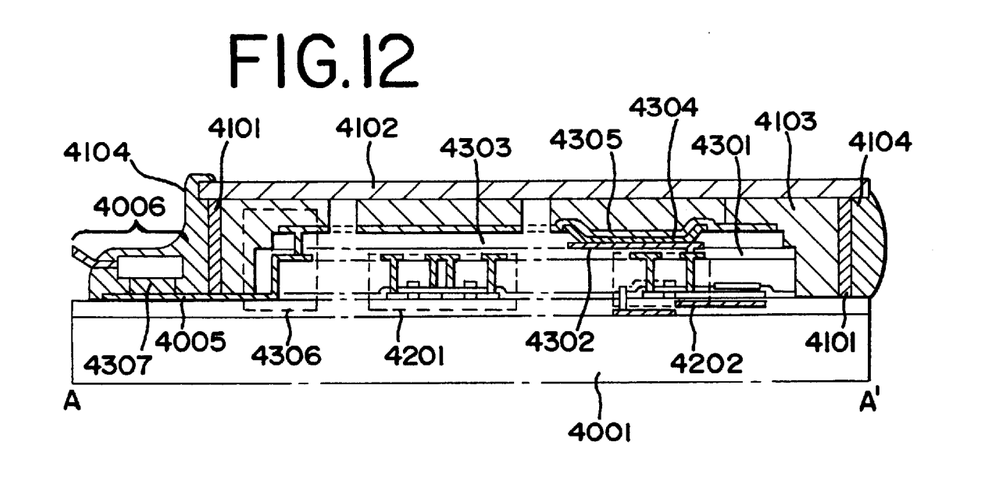
FIG. 12 is a cross sectional view of the structure of the active matrix EL display device.

In FIGS. 11 and 12, reference numeral 4001 denotes a substrate, reference numeral 4002 denotes a pixel portion, reference numeral 4003 denotes a source signal line driver circuit, 4004 denotes a gate signal line driver circuit. Each of the driver circuits is connected to an external equipment via a connection wiring 4005 leading to an FPC (flexible printed circuit) 4006.

A first sealing material 4101, a cover material 4102, a filler material 4103, and a second sealing material 4104 are formed at this point so as to surround the pixel portion 4002, the source signal line driver circuit 4003, and the gate signal line driver circuit 4004.

FIG. 12 is a cross sectional diagram corresponding to FIG. 11 cut along the line A–A'. A driver TFT 4201 (note that an n-channel TFT and a p-channel TFT are shown here) contained in the source signal line driver circuit 4003 on the substrate 4001, and a pixel TFT 4202 (a TFT for controlling the electric current flowing in an EL element) contained in the pixel portion 4002 are formed.

The pixel TFT 4202 is formed by using the capacitor element structure of the present invention in this embodiment. Thus, the pixel TFT 4202 uses a TFT which have a same structure as that of FIG. 8E.

An interlayer insulating film (leveling film) 4301 is formed on the driver TFT 4201 and the pixel TFT 4202 from a resin material, and a pixel electrode 4302 which is electrically connected to either a source region or a drain region of the pixel TFT 4202 is formed on the interlayer insulating film. A transparent conductive film having a large work coefficient is used as the pixel electrode 4302. A chemical compound of indium oxide and tin oxide or a chemical compound of indium oxide and zinc oxide can be used as the transparent conductive film.

An insulating film 4303 is then formed on the pixel electrode 4302, and an open portion is formed in the insulating film 4303 over the pixel electrode 4302. An EL layer 4304 is formed on the pixel electrode 4302 in the open portion. Known organic EL materials and known inorganic materials can be used for the EL layer 4304. Further, low molecular weight (monomer) materials and high molecular weight (polymer) materials exist as organic EL materials, and either may be used.

A known evaporation technique or a known application technique may be used as a method of forming the EL layer 4304. Further, the structure of the EL layer may be a lamination structure or a single layer structure, in which hole injecting layers, hole transporting layers, light emitting layers, electron transporting layers, and electron injecting layers are freely combined.

A cathode 4305 composed of a conducting film having light shielding properties (typically a conductive film having aluminum, copper, or silver as its main constituent, or a lamination film of these and another conducting film) is formed on the EL layer 4304. Furthermore, it is preferable to remove, as much as possible, moisture and oxygen existing in the interface between the cathode 4305 and the EL layer 4304. It is therefore necessary to employ a scheme such as forming both films in succession within a vacuum, or one in which the EL layer 4304 is formed in a nitrogen or inert gas environment, and then the cathode 4305 is formed without exposure to oxygen or moisture. It is possible to perform the above stated film formation in Embodiment 3 by using a multi-chamber method (cluster tool method) film formation apparatus.

The cathode 4305 is then electrically connected to the connection wiring 4005 in a region shown by reference numeral 4306. The connection wiring 4005 is a wiring for imparting a predetermined voltage to the cathode 4305, and the connection wiring 4005 is electrically connected to the FPC 4006 through an anisotropic conductive film 4307.

An EL element composed of the pixel electrode 4302, the EL layer 4304, and the cathode 4305 is thus formed. The EL element is surrounded by the first sealing material 4101, and by the cover material 4102 which is joined to the substrate 4001 by the first sealing material 4101, and is enclosed by the filler material 4103.

In this specification, the EL element (light emitting element) is structured that the EL layer (organic compound layer) is placed between a couple of electrode (anode and cathode). The organic compound layer can be formed by using known luminescence material. Moreover, in the organic compound layer, there are two structures of the single-layer structure and the lamination structure. but the present invention can be used both structures. In luminescence in the organic compound layer, there are luminescence (fluorescence) when it returns from the singlet exciton state to the ground state and luminescence ( phosphorus) when it returns from the triplet exciton state to the ground state. The present invention can be also applied to light emitting devices which uses either luminescence.

Further, a glass material, a metallic material (typically a stainless steel material), a ceramic material, an FRP (fiberglass reinforced plastics) plate, a PVF (polyvinyl fluoride) film, a mylar film, a polyester film, and an acrylic resin film can be used as the cover material 4102. Further, a sheet having a structure in which aluminum foil is sandwiched by a PVF film or a mylar film can also be used.

Note that, it is necessary for the cover material to be transparent for cases in which the irradiating direction of light from the EL elements is toward the cover material side. A transparent material such as a glass plate, a plastic plate, a polyester film, or an acrylic film, is used in this case.

Further, an ultraviolet hardening resin or a thermally hardening resin can be used as the filler material 4103. PVC (polyvinyl chloride), acrylic, polyimide, epoxy resin, silicon resin, PVB (polyvinyl butyral) and EVA (ethylene vinyl acetate) can be used. Deterioration of the EL elements can be suppressed if a drying agent (preferably barium oxide) or an oxidation preventing agent having an oxygen capturing effect is formed on the inside of the filler material 4103.

Furthermore, spacers may also be included within the filler material 4103. It is possible to give the spacers themselves moisture absorbency by forming the spacers from barium oxide. Further, when forming spacers, it is also effective to form a resin film on the cathode 4305 as a buffer layer for relieving pressure from the spacers.

The connection wiring 4005 is electrically connected to the FPC 4006 through the anisotropic conductive film 4307. The connection wiring 4005 transmits signals sent from the pixel portion 4002, the source signal line driver circuit 4003, and the gate signal line driver circuit 4004 to the FPC 4006, and the wiring is electrically connected to external equipment by the FPC 4006.

Further, the second sealing material 4104 is formed so as to cover exposed portions of the first sealing material 4101 and a portion of the FPC 4006, resulting in a structure in which the EL elements are completely cutoff from the atmosphere. This becomes the EL display device having the cross sectional structure of FIG. 12. Note that it is possible to implement Embodiment 8 in combination with Embodiments 1 and 2.

[Embodiment 4]

In this embodiment, a cross-sectional structure of a display device in which an upper light shielding film is provided in addition to a lower light shielding film provided under a transistor is described with reference to FIG. 14.

Figure 14:
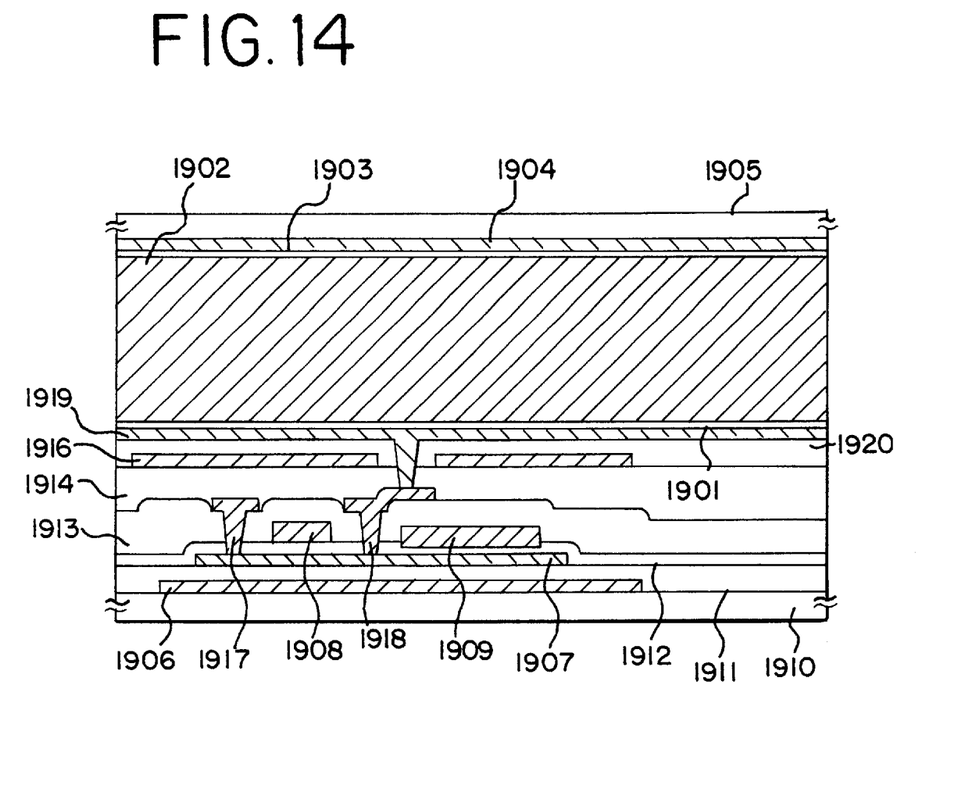
FIG. 14 is a cross sectional view of the active matrix display device.

In FIG. 14, reference numeral 1910 indicates a substrate having an insulating surface. A glass substrate, a quartz substrate or the like may be used as the substrate 1910. A light shielding film 1906 is provided on the substrate 1910. Note that the light shielding film 1906 is formed from an element selected from the group consisting of tantalum (Ta), titanium (Ti), molybdenum (Mo), tungsten (W), chrome (Cr) and silicon (Si) or an alloy film of the combination of the above elements by a known method. Further, the light shielding film 1906 has a function of shielding a transistor from light.

Next, a first insulating film 1911 is provided on the light shielding film 1906, and a semiconductor film 1907 is provided on the first insulating film 1911. Note that, in this embodiment, a silicon oxide film is formed with a thickness of 300 nm as the first insulating film 1911. Further, the semiconductor film 1907 is formed from a known material by a known method.

Subsequently, a gate insulating film 1912 is provided on the semiconductor film 1907. Then, a gate electrode 1908 and a capacitor wiring 1909 are provided on the gate insulating film 1912. Note that, in this embodiment, the region where the light shielding film 1906, the semiconductor film 1907 and the capacitor wiring 1909 overlap with each other corresponds to a storage capacitor.

Reference numeral 1913 indicates a second insulating film. In this embodiment, a silicon oxide film is formed as the second insulating film 1913. Then, contact holes are formed in the gate insulating film 1912 and the second insulating film 1913, and a source wiring 1917 and a drain wiring 1918 are provided.

Reference numeral 1914 indicates a third insulating film. In this embodiment, a silicon oxide film is formed as the third insulating film 1913. An upper light shielding film 1916 formed using a known material is provided on the third insulating film 1913. The upper light shielding film 1916 is formed using a known material and has a function of shielding a transistor from light.

Reference numeral 1920 indicates a fourth insulating film. Subsequently, a contact hole is formed in the third insulating film 1914 and the fourth insulating film 1920, and a pixel electrode 1919 is provided.

As shown in FIG. 14, the pixel electrode 1919 is electrically connected with a drain wiring 1918. Note that, in this embodiment, although the pixel electrode 1919 is connected with the drain wiring 1918, the present invention is not limited to this, and the pixel electrode 1919 may be connected with a source wiring 1917. Note that one of the source and drain regions, which is connected with the pixel electrode, has a larger area than the other region.

Reference numeral 1901 indicates an orientation film. In this embodiment, a polyimide film is used as the orientation film 1901. Further, an opposing electrode 1904 formed of a transparent conductive film and an orientation film 1903 are formed on an opposing substrate 1905. Note that a color filter or a shielding film may be formed on the opposing electrode 1905 if necessary.

After the orientation film 1903 is formed, rubbing processing is conducted such that liquid crystal molecules are oriented with a certain constant pre-tilt angle. Then, an active matrix substrate on which a pixel portion and a driver circuit are formed and the opposing substrate are sealed through a sealing member, a spacer (both not shown in the figure) or the like by a known cell assembling process. Thereafter, liquid crystal 1902 is injected between both the substrates to completely seal the liquid crystal by a sealant (not shown). A known liquid crystal material may only be used as the liquid crystal 1902. Thus, the active matrix liquid crystal display device shown in FIG. 14 is completed.

Note that this embodiment can be freely combined with Embodiments 1 to 3.

[Embodiment 5]

The active matrix display device manufactured by employing the present invention may be used as a display portion of electric equipment. As such electric equipments, there are given a video camera, a digital camera, a projector, a projection TV, a goggle type display (head mount display), a navigation system, a sound reproduction device, a note type personal computer, a game device, a portable information terminal (such as a mobile computer, a cell phone, a portable type game device or an electronic book), an image playback device having a recording medium, and the like. Specific examples of such electric equipments are given in FIGS. 13A to 13F.

Figure 13A:
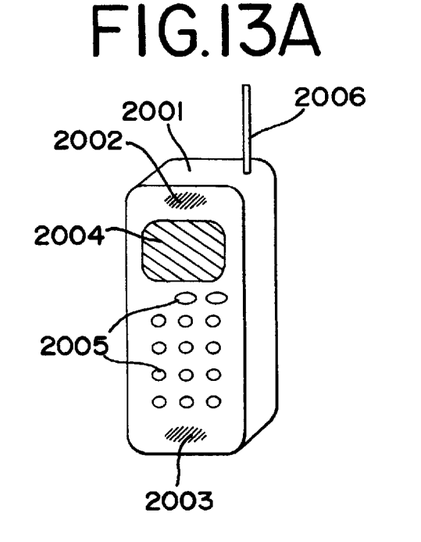
FIGS. 13A to 13F show examples of electric equipment.

FIG. 13A shows a cell phone that is composed of a main body 2001, a voice output portion 2002, a voice input portion 2003, a display portion 2004, operating switches 2005, and an antenna 2006. The active matrix display device of the present invention may be used in the display portion 2004.

Figure 13B:
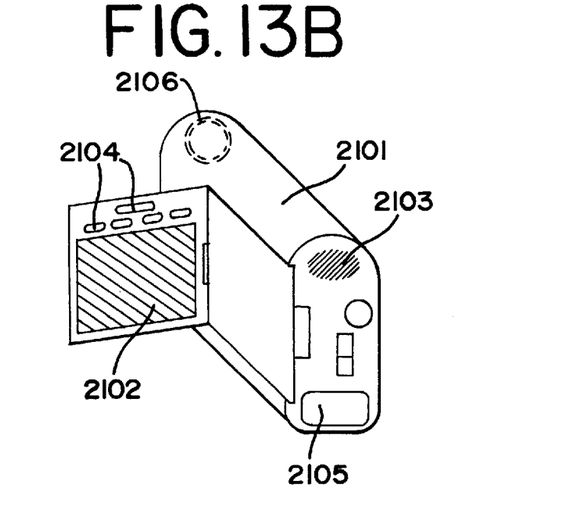

FIG. 13B shows a video camera that is composed of a main body 2101, a display portion 2102, a sound input portion 2103, operation switches 2104, a battery 2105, and an image receiving portion 2106. The active matrix display device of the present invention may be used in the display portion 2102.

Figure 13C:
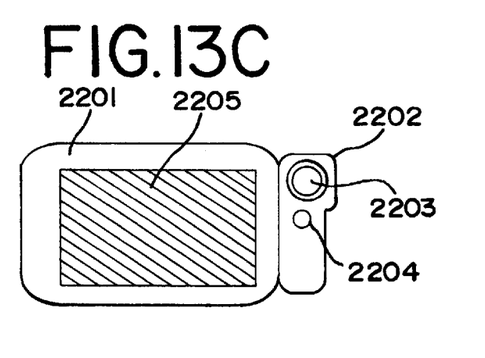

FIG. 13C shows a mobile computer that is composed of a main body 2201, a camera portion 2202, an image receiving portion 2203, an operating switch 2204 and a display portion 2205. The active matrix display device of the present invention may be used in the display portion 2205.

Figure 13D:
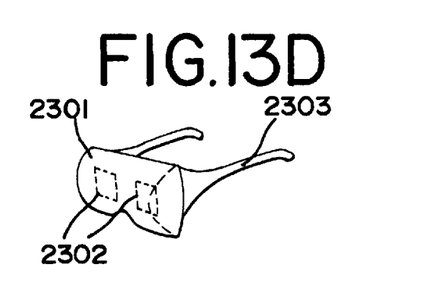

FIG. 13D shows a goggle type display that is composed of a main body 2301, display portions 2302 and arm portions 2303. The active matrix device of the present invention may be used as the display portions 2302.

Figure 13E:
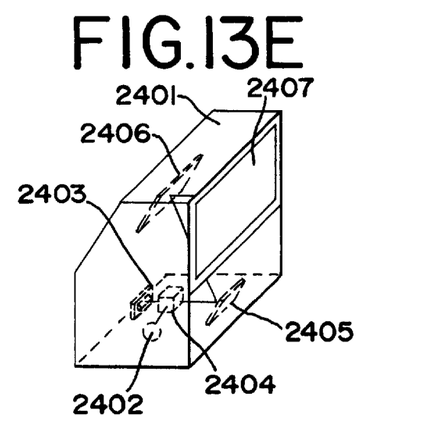

FIG. 13E shows a rear projector (projection TV) which is composed of a main body 2401, a light source 2402, a display device 2403, a polarized light beam splitter 2404, reflectors 2405, 2406, and a screen 2407. The present invention may be applied to the liquid crystal display device 2403.

Figure 13F:
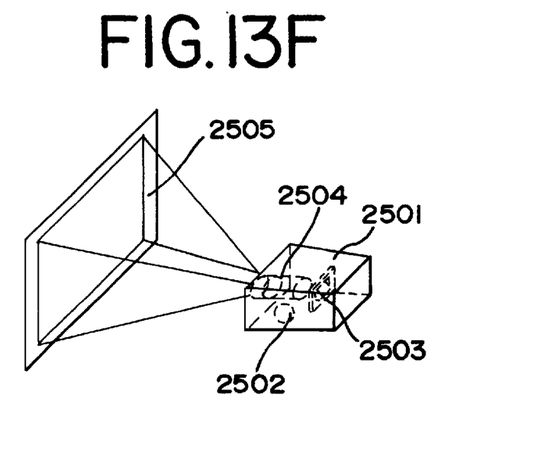

FIG. 13F shows a front projector which is composed of a main body 2501, a light source 2502, a display device 2503, an optical system 2504 and a screen 2505. The present invention may be applied to the liquid crystal display device 2503.

As described above, the application range of the present invention is extremely wide, and may be applied to electric equipments in all fields. Further, the electronic equipments of this embodiment may be realized by using structures of Embodiments 1 and 4 in any combination.

By manufacturing the active matrix display device having the storage capacitor according to the present invention, a sufficient storage capacitor can be secured by using the light shielding film even with a reduction of the area of one pixel, thereby being capable of improving the display quality. At the same time, the quality of electronic equipment using the active matrix display device according to the present invention as its display portion can be improved.

What is claimed is:

1. A display device comprising:
   a first light shielding film formed on an insulating surface;
   a first insulating film formed on said first light shielding film;
   a second light shielding film formed on said first insulating film;
   a second insulating film formed on said second light shielding film;
   a semiconductor film formed on said second insulating film, said semiconductor film having a source region, a drain region and a channel forming region;
   a third insulating film formed on said semiconductor film; and
   a gate electrode formed on said third insulating film,
   wherein said second light shielding film and one of said source and drain regions are formed overlapping with each other.

2. A display device according to claim 1, wherein the thickness of said first insulating film is 500 nm or more.

3. A display device according to claim 1, wherein the thickness of said second insulating film is 300 nm or less.

4. A display device according to claim 1, wherein said first light shielding film has conductivity.

5. A display device according to claim 1, wherein said second light shielding film has conductivity.

6. A display device according to claim 1, wherein said second light shielding film is formed overlapping only one of said source and drain regions which is connected with a pixel electrode.

7. A display device according to claim 1, wherein one of said source and drain regions, which is connected with a pixel electrode, has a larger area than the other region.

8. A display device according to claim 1, wherein said first light shielding film is a gate signal line.

9. A display device according to claim 1, wherein said third insulating film sandwiched by said semiconductor film and said gate electrode is thicker than said third insulating film sandwiched by said semiconductor film and said capacitor wiring.

10. A display device according to claim 1, wherein said channel forming region is shielded from light by said first and second light shielding films.

11. A display device according to claim 1, wherein said semiconductor film has an LDD region shielded from light by said first and second light shielding films.

12. A display device according to claim 1, wherein said semiconductor film has an offset region shielded from light by said first and second light shielding films.

13. A display device according to claim 1, wherein said display device is incorporated into an electric equipment selected from the group consisting of a video camera, a digital camera, a projector, a projection TV, a goggle type display, a navigation system, a sound reproduction device, a note type personal computer, a game device, a mobile computer, a cell phone, a portable type game device, an electronic book, and an image playback device.

14. A display device comprising:
   a first light shielding film formed on an insulating surface;
   a first insulating film formed on said first light shielding film;
   a second light shielding film formed on said first insulating film;
   a second insulating film formed on said second light shielding film;

a semiconductor film formed on said second insulating film, said semiconductor film having a source region, a drain region and a channel forming region;

a third insulating film formed on said semiconductor film; and a gate electrode and a capacitor wiring which are formed on said third insulating film, wherein said second light shielding film, one of said source and drain regions and said capacitor wiring are formed overlapping with each other.

15. A display device according to claim 14, wherein the thickness of said first insulating film is 500 nm or more.

16. A display device according to claim 14, wherein the thickness of said second insulating film is 300 nm or less.

17. A display device according to claim 14, wherein said first light shielding film has conductivity.

18. A display device according to claim 14, wherein said second light shielding film has conductivity.

19. A display device according to claim 14, wherein said second light shielding film is formed overlapping only one of said source and drain regions which is connected with a pixel electrode.

20. A display device according to claim 14, wherein one of said source and drain regions, which is connected with a pixel electrode, has a larger area than the other region.

21. A display device according to claim 14, wherein said first light shielding film is a gate signal line.

22. A display device according to claim 14, wherein said third insulating film sandwiched by said semiconductor film and said gate electrode is thicker than said third insulating film sandwiched by said semiconductor film and said capacitor wiring.

23. A display device according to claim 14, wherein said channel forming region is shielded from light by said first and second light shielding films.

24. A display device according to claim 14, wherein said semiconductor film has an LDD region shielded from light by said first and second light shielding films.

25. A display device according to claim 14, wherein said semiconductor film has an offset region shielded from light by said first and second light shielding films.

26. A display device according to claim 14, wherein said display device is incorporated into an electric equipment selected from the group consisting of a video camera, a digital camera, a projector, a projection TV, a goggle type display, a navigation system, a sound reproduction device, a note type personal computer, a game device, a mobile computer, a cell phone, a portable type game device, an electronic book, and an image playback device.

27. A display device comprising:
a first light shielding film formed on an insulating surface;
a first insulating film formed on said first light shielding film;
a second light shielding film formed on said first insulating film;
a second insulating film formed on said second light shielding film; and
a thin film transistor formed on said second insulating film,
wherein said second light shielding film and one of source and drain regions of said thin film transistor are formed overlapping with each other.

28. A display device according to claim 27, wherein the thickness of said first insulating film is 500 nm or more.

29. A display device according to claim 27, wherein the thickness of said second insulating film is 300 nm or less.

30. A display device according to claim 27, wherein said first light shielding film has conductivity.

31. A display device according to claim 27, wherein said second light shielding film has conductivity.

32. A display device according to claim 27, wherein said display device is incorporated into an electric equipment selected from the group consisting of a video camera, a digital camera, a projector, a projection TV, a goggle type display, a navigation system, a sound reproduction device, a note type personal computer, a game device, a mobile computer, a cell phone, a portable type game device, an electronic book, and an image playback device.

33. A display device comprising:
a first light shielding film formed on an insulating surface;
a first insulating film formed on said first light shielding film;
a second light shielding film formed on said first insulating film;
a second insulating film formed on said second light shielding film; and
a thin film transistor formed on said second insulating film,
wherein said first light shielding film is electrically connected to a gate electrode of said thin film transistor.

34. A display device according to claim 33, wherein the thickness of said first insulating film is 500 nm or more.

35. A display device according to claim 33, wherein the thickness of said second insulating film is 300 nm or less.

36. A display device according to claim 33, wherein said first light shielding film has conductivity.

37. A display device according to claim 33, wherein said second light shielding film has conductivity.

38. A display device according to claim 33, wherein said display device is incorporated into an electric equipment selected from the group consisting of a video camera, a digital camera, a projector, a projection TV, a goggle type display, a navigation system, a sound reproduction device, a note type personal computer, a game device, a mobile computer, a cell phone, a portable type game device, an electronic book, and an image playback device.

39. A display device comprising:
a first light shielding film formed on an insulating surface;
a first insulating film formed on said first light shielding film;
a second light shielding film formed on said first insulating film;
a second insulating film formed on said second light shielding film; and
a thin film transistor formed on said second insulating film,
wherein said first light shielding film and a source region of said thin film transistor are formed overlapping with each other,
wherein said second light shielding film and a drain region of said thin film transistor are overlapped with each other.

40. A display device according to claim 39, wherein the thickness of said first insulating film is 500 nm or more.

41. A display device according to claim 39, wherein the thickness of said second insulating film is 300 nm or less.

42. A display device according to claim 39, wherein said first light shielding film has conductivity.

43. A display device according to claim 39, wherein said second light shielding film has conductivity.

44. A display device according to claim 39, wherein said display device is incorporated into an electric equipment selected from the group consisting of a video camera, a digital camera, a projector, a projection TV, a goggle type display, a navigation system, a sound reproduction device, a note type personal computer, a game device, a mobile computer, a cell phone, a portable type game device, an electronic book, and an image playback device.

* * * * *